(12) United States Patent
Engelaere

(10) Patent No.: US 6,511,723 B1
(45) Date of Patent: Jan. 28, 2003

(54) MULTILAYER STRUCTURE ABLE TO BE OBTAINED BY COLLAPSING A CO-EXTRUSION BUBBLE

(75) Inventor: Jean-Claude Engelaere, Koudekerke-Branche (FR)

(73) Assignee: Soplaril, S.A. (FR)

( * ) Notice: Subject to any disclaimer, the term of this patent is extended or adjusted under 35 U.S.C. 154(b) by 0 days.

(21) Appl. No.: 09/574,837

(22) Filed: May 19, 2000

(30) Foreign Application Priority Data

May 21, 1999 (FR) .......................................... 99 06504

(51) Int. Cl.[7] .............................................. B65D 81/00
(52) U.S. Cl. ..................... 428/35.7; 428/40.1; 428/41.3; 428/41.7; 428/41.8; 428/202; 428/203; 428/205; 428/336; 428/517
(58) Field of Search ........................ 428/35.7, 336–512, 428/40.1, 41.3, 41.7, 41.8, 202–205

(56) References Cited

U.S. PATENT DOCUMENTS

| | | | | |
|---|---|---|---|---|
| 3,454,210 A | * | 7/1969 | Spiegel ..................... 229/123.1 |
| 4,673,601 A | | 6/1987 | Lamping et al. ............ 428/35.7 |
| 4,791,024 A | * | 12/1988 | Clerici et al. ............... 428/343 |
| 4,858,780 A | | 8/1989 | Odaka et al. ................ 220/359 |
| 4,956,228 A | * | 9/1990 | Clerici et al. ............... 428/336 |
| 5,089,320 A | | 2/1992 | Straus et al. ................ 428/349 |
| 5,382,472 A | | 1/1995 | Yanidas et al. ............. 220/359 |
| 5,389,438 A | * | 2/1995 | Miller et al. ................ 428/355 |
| 5,882,749 A | * | 3/1999 | Jones et al. ................ 428/35.2 |

FOREIGN PATENT DOCUMENTS

| | | |
|---|---|---|
| AU | 720465 | 6/1997 |
| EP | 0 403 393 A1 | 12/1990 |
| EP | 0 661 154 b1 | 7/1995 |
| FR | 2 669 607 A1 | 5/1992 |
| GB | 2 319 746 A | 6/1998 |
| WO | WO 90/07427 | 7/1990 |

* cited by examiner

Primary Examiner—Mark L. Bell
Assistant Examiner—Shalie Manlove
(74) Attorney, Agent, or Firm—Pennie & Edmonds LLP

(57) ABSTRACT

A multilayer structure, for a re-closable packaging which can be readily and effectively opened and then re-sealed is provided comprising a central pressure-sensitive adhesive layer and two outer layers, one of which is a tearable welding layer, the central adhesive layer comprising two sub-layers and the structure being able to be obtained by collapsing the co-extrusion bubble, together with a packaging comprising at least one tearable film having this symmetrical multilayer structure, and a process for producing the structure and the packaging.

19 Claims, 3 Drawing Sheets

FIG. 3

MULTILAYER STRUCTURE ABLE TO BE OBTAINED BY COLLAPSING A CO-EXTRUSION BUBBLE

SUMMARY OF THE INVENTION

None of the above documents teaches nor suggests the invention.

Thus, the invention provides a multilayer structure (C), comprising an extrudable central pressure-sensitive adhesive layer (3), where the central adhesive layer comprises two extrudable pressure-sensitive adhesive sub-layers, and two extrudable outer layers (2) and (4), at least one of which is able to function as a tearable welding layer (4), the structure (C) being formed by collapsing a co-extrusion bubble.

According to one embodiment, collapsing the co-extrusion bubble is done in an oxidizing medium.

According to another embodiment, the extrudable central pressure-sensitive adhesive layer (3) comprises a thermoplastic elastomer-based hot melt adhesive.

According to one embodiment, each of the extrudable outer layers (2) and (4) comprises a polyethylene.

According to another embodiment, the outer layers comprise metallocene PE.

The invention also provides a process for preparing a structure according to the invention, by collapsing the co-extrusion bubble on itself.

Collapsing is preferably done in an oxidizing medium.

The invention also provides a multilayer package comprising an extrudable inner layer interposed on one outermost side of the central pressure-sensitive layer, where the inner layer is able to function as a tearable welding layer, and where at least a portion of the package is formed by welding the inner layer to itself.

The invention also provides a process for preparing a packaging according to the invention.

The invention will now be described in more detail below, with reference to the attached drawings.

DETAILED DESCRIPTION OF THE PREFERRED EMBODIMENTS

Figure 1:
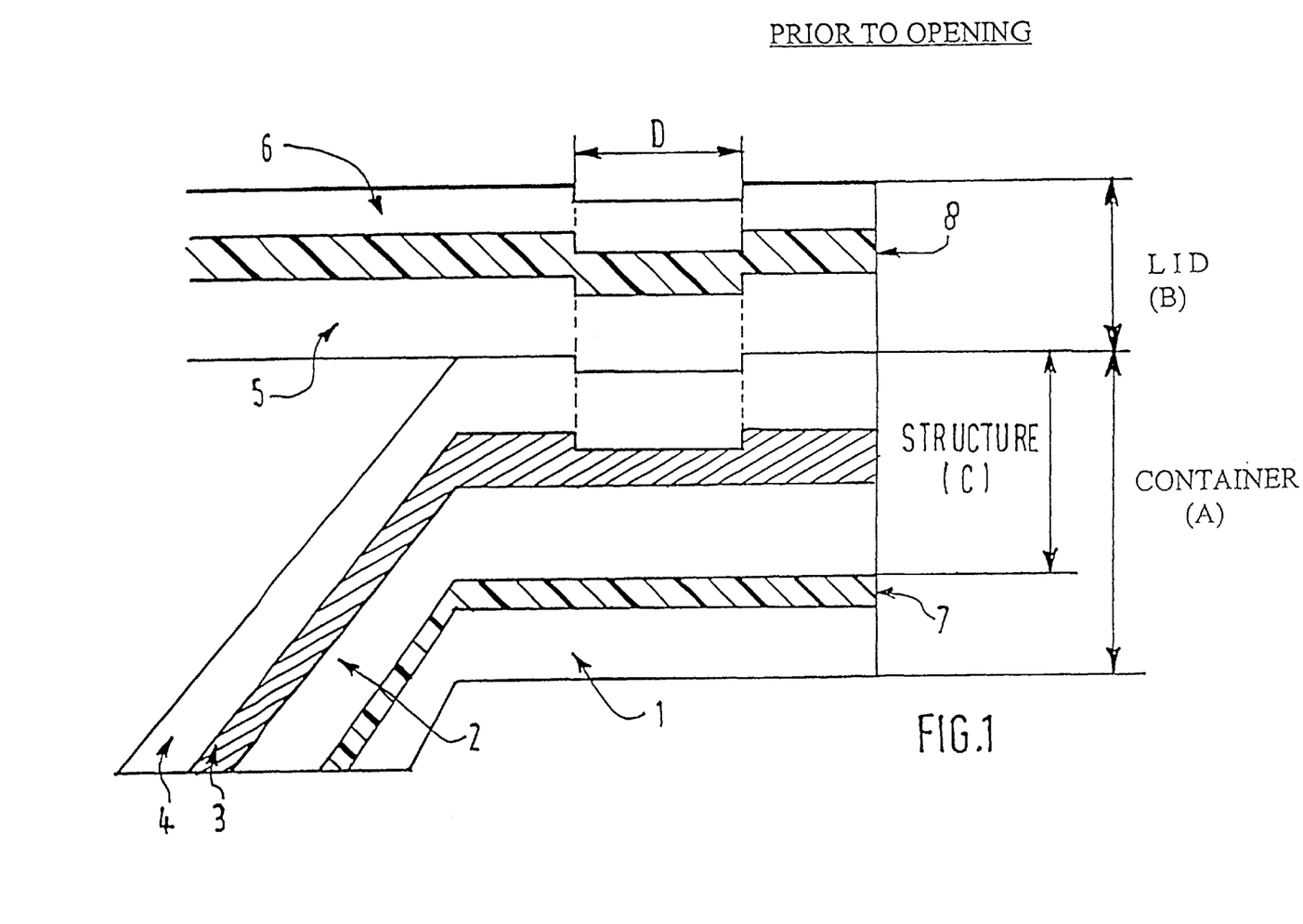
FIG. 1 shows the packaging in one embodiment of the invention prior to opening.

FIG. 1 illustrates the packaging in one embodiment of the invention, after welding. This packaging comprises a container (A) and a lid (B). Container (A) comprises a support layer (1), an optional complexable layer (2), a pressure-sensitive adhesive layer (3) and a tearable welding layer (4). The container can also comprise, between the support layer (1) and the complexable layer (2) a bonding layer (7), if necessary. One sub-portion of this container (A) is the structure (C), which comprises the layers (2), (3) and (4). Lid (B) comprises a support layer (6) and a welding layer (5) bonded together by optional binder layer (8). The tearable welding layer (4) and welding layer (5) face each other. Lid (B) is welded to container (A) for example by die pressing, using sealing jaws of which preferably only one is a heating jaw, the latter being disposed at the lid side. In other words, deformation of container and lid occurs in the welding region, seam (D). This deformation is characterised by a reduction and/or modification in thickness, due to softening and/or melting of certain layers which leads to creep of their components over the edges of the welding seam. The welding region (seam (D)) delimits the weakened region. Support layer (6) of the lid (B) is in general little affected by welding, as the components of the support layer have a melting point which is generally distinctly higher than that of the components of the welding layer (5). The same generally applies to bonding layer (8) of the lid. The above remarks similarly apply to support layer (1) and bonding layer (7) of container (A), which, additionally, are further from the source of heat in the preferred case where only one heated sealing jaw is used at the lid side.

Welding conditions (time, temperature, pressure) are set conventionally so that deformation is located at the tearable welding layer (4) and welding layer (5). As adhesive layer (3) is generally malleable by its nature, and generally represents a relatively insignificant thickness of structure (C), there would generally not be melting or creep (lateral flow) throughout the totality of the thickness. As the adhesive layer substantially supports all of the deformation, complexable layer (2) will consequently, generally, not be deformed and consequently not weakened. The weakening, at the welding seam, is consequently principally generated in the tearable welding layer (4), and possibly, partially in adhesive layer (3). Welding layer (5) is not fragile and its tear strength is greater than that of layer (4), as well as the cohesive strength of adhesive layer (3). When the packaging is opened, stresses propagate and bring about rupture at the most fragile layers, in other words the tearable welding layer (4) and a part of the thickness of the adhesive layer.

Figure 2:
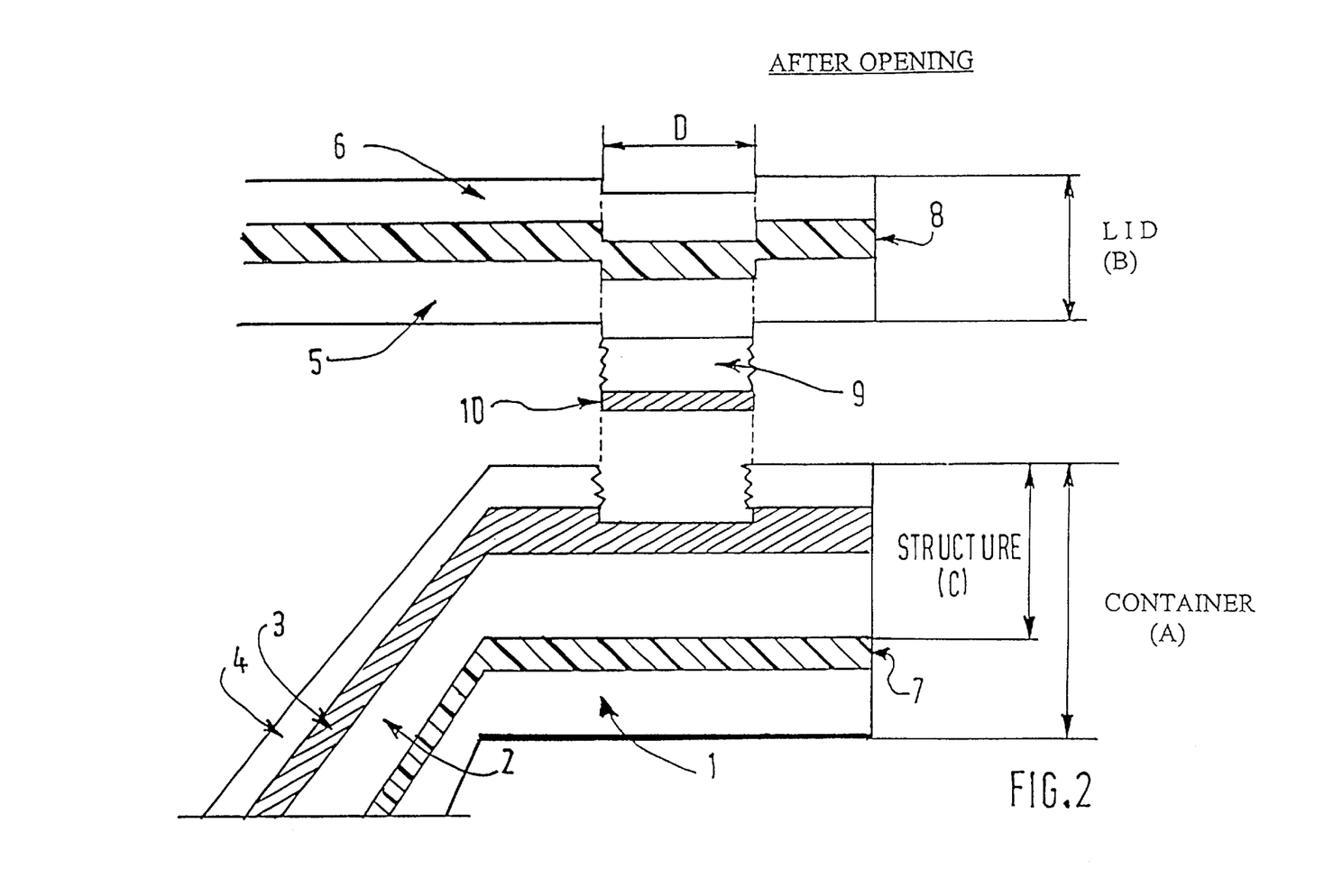
FIG. 2 shows the packaging in one embodiment of the invention after opening.

FIG. 2 shows the packaging according to the invention after opening. Tearing occurs at both sides of the welding seam (D) (the regions where the jaws operate), the effect of which is to uncover a strip composed of the torn tearable welding layer (9) and a part (10) of pressure sensitive adhesive layer (3), which remains welded to the welding layer of lid (B). After opening, a part of pressure sensitive adhesive layer (3) providing for re-sealing, is located on each one of the inner faces of container (A) and lid (B) of the packaging. It is now sufficient to reposition the two regions corresponding to the tear face-to-face and to exercise pressure in order to re-close the packaging. The re-sealing force (re-bonding of the adhesive to itself) is proportional to the pressure exercised for re-closing. In general, tearing in the adhesive layer leads to the latter appearing slightly cloudy due to surface irregularity of the rupture giving an iridescent effect. Re-sealing is now at a maximum when the pressure exerted renders the tear region again transparent. In effect, in this case, the continuity of the adhesive layer has been reconstituted, and this adhesive layer no longer shows any surface iridescence. Reopening and re-closing are identical to the operations described above.

One advantage of the invention compared to the prior art in the case of a (heat-) molded structure with a lid resides in the fact that the adhesive is located at container level. Thus, by using only one single heated sealing jaw for welding, and by doing the welding at the lid side (which is, in general, the case as the lid is usually thinner than the receptacle), the invention makes it possible to limit deformation of the adhesive, as the latter is further from the source of heat than in the prior art.

One could also have tearing occur at the adhesive layer (3)/welding layer (4) interface, and even, possibly, at the adhesive layer (3)/complexable layer (2) interface. It is however preferred that the rupture be a cohesive rupture (rupture in the thickness of the layer by loss of cohesion) in adhesive layer (3). Such a cohesive rupture can notably be obtained in two ways: firstly, by adding additives and, secondly, by the bubble collapsing technique. These two methods, which are not limiting, are described below.

It will be noted at this point that the type of packaging of the above embodiment could be described, speaking simply, as a conventional packaging in which the welding film is replaced by a multilayer structure (C) We now have a packaging in which the adhesive is no longer in the lid but rather in the container, which is the reverse of resealable packaging prior art, in which the adhesive layer is found in the lid.

In the case where flexible pouches or bags are produced, the multilayer film forming container (A) is welded to itself. In this case, the packaging can now be thought of as comprising two joined containers, one (A) on one side of the weld and the other (A') on the opposite side of the weld, each having the same configuration. The mechanism of operation is the same as above. Also in this case, a system of sealing jaws which only apply heat on the one side will preferably be used. The portion located at the heated sealing jaw side undergoes die pressing whereas the one at the unheated side does not undergo this. In this way, upon opening, only the tearable welding layer that was situated at the heated side tears, and opening is consequently better defined. Thus, the situation is now identical to the one described previously. Container (A') could also comprise a bonding layer (7'), just like container (A). Generally, where flexible bags are produced, elements (A) and (A') are formed from the same structure.

It is clear that the complexable layer (2) is not essential and can be omitted, for example where the sheet from which container (A) is produced has been made by extrusion. In this case, adhesive (3) will be provided directly on the support (1). In the case of co-extrusion, one can for example produce a tearable multilayer of the PET or PS type, or a PP/hot melt type adhesive/PE multilayer on a suitable line (such as a (flat) cast co-extrusion line able to produce heat-shapeable semi-rigid sheets of the order of 500 µm). In the case of calendering, the complexable layer is generally present and one can first co-extrude a triple layer film comprising complexable PE/hot melt adhesive/tearable PE, and apply it, a bit further on, to a support film, for example a PVC film (in such a case the complexable layer is not corona treated). The support film leaving the calendar is still hot (just like, generally, the extruded triple layer film) when the triple layer film is applied. This ensures maximum avoidance of deformation of the support sheets, such as PVC sheets. Adhesion of the double layer film is improved when application thereof is done using a calendar. The final multilayer product can then be subject to hot forming or another treatment, if necessary. As against this, this complexable double layer will be generally present when the sheet from which container (A) is made is produced by a lamination process.

The various layers will now be described in more detail.

Container (A) comprises, schematically, a support layer (1), on which structure (C) is applied, said structure (C) comprising layers (2), (3) and (4).

This structure (C) has a thickness generally comprised between 20 and 200 µm, preferably 30 to 100 µm. Adhesive layer (3) preferably makes up more than 30%, advantageously more than 40% of the thickness of structure (C); layers (2) and (4) each generally make up from 10 to 50%, preferably from 10 to 30% thereof.

Complexable layer (2) (or layer for lamination) is located on the inner face and is designed to be bonded to the support layer (1), optionally through a binding layer (7). This complexable layer will advantageously be Corona discharge treated (especially in case of lamination), preferably such that its surface tension is greater than 38 dynes. This layer is conventionally a polyolefin. Corona treatment facilitates keying of complexable layer (2) to support layer (1), preferably via a bonding layer (7); notably, this layer is an adhesive. Complexable layer (2) thus makes it possible:

(i) to balance the structure during co-extrusion to prevent the film "rolling" about itself, this being detrimental to machinability during complexing;

(ii) to protect the adhesive layer which is thus sandwiched;

(iii) to impart body to (in other words rigidity to) the structure, (polyolefins being fairly rigid), which improves its withstand abilities and machinability; and (iv) to facilitate extrusion of the adhesive layer as layer (2) plays the role of a support and prevents sticking to the various elements of the co-extrusion line.

This complexable layer can be transparent or opaque. Its thickness can vary from 10 to 100 µm, preferably from 10 to 30 µm.

This complexable layer is a polyolefin. This term, i.e., polyolefin, should be taken in its normally acceptable sense in the art. By way of examples we can cite homopolymers and copolymers of olefins, with other olefins or other types of monomer (such as vinyl acetate, alkyl (meth)acrylate). Specific examples are: PE (such as: HDPE, MDPE, LMDPE LDPE, LLDPE, VLDPE, metallocene PE), PP, copolymers of PE with an alpha-olefin, EVA copolymers, etc.

The composition of this layer can also be adapted to improve adhesion to adhesive layer (3). Thus, this layer can comprise from 20 to 90%, preferably from 50 to 70%, metallocene PE or co-extrusion binder (such as those based on modified PE).

Various additives can be present, for example anti-oxidizing agents, anti-blocking agents, slip agents, etc, notably for facilitating extrusion and machinability (processability) of the film.

Tearable welding layer (4) is located on the outer face of structure (C). Its function is to provide closing of the packaging by heat sealing. The layer is either sealed to itself (when making bags or pouches) or onto the welding layer of the lid (for example, weld between the lid and a rigid receptacle or tub). This layer (4) is tearable, preferably in both directions (machine direction MD and transverse direction TD). Such a tearability is for example obtained through the choice of the resins employed in the mixture and/or by adding mineral fillers which increase fragility and/or by adjusting thickness. The melting temperature of this layer (4) is generally greater than that of welding layer (5).

This tearable welding layer can be transparent or opaque. Its thickness can vary from 10 to 100 µm, preferably from 10 to 30 µm.

This layer is generally a polyolefin; the polyolefin can notably be the same as the one employed for the complexable layer.

This tearable welding layer, being on the outside, will advantageously have good machinability, obtained, for example, by adding slip and anti-blocking agents facilitating sliding over the elements of the packaging machine. Such sliding will in particular be appreciated when using vertical machines. (Ks<0.25, where Ks is the static coefficient of sliding). This welding layer will advantageously have hot adhesive properties (or hot resistance properties) even while the weld or seal is still hot: the seal will not re-separate when the product to be packaged falls into the bag (in the case of a vertical machine) and/or when a gas is injected from the thermoforming machine (in other words said welding layer advantageously has "hot tack" properties). For this latter property, metallocene PE will advantageously be added to the said welding layer. The formulation of this tearable welding layer will also preferably be adjusted to prevent a tacky feel, in order to avoid all undesirable sticking or any contamination by the packaged product. The fillers that can be added in order to encourage tearing are inorganic fillers, such as talc and calcium carbonate, present in amounts comprised for example between 5 and 30%, preferably between 5 and 15%.

Other additives can also be added, such as anti-misting agents, and surfactants can also be deposited on its outer face.

This tearable welding layer tears substantially only in the weld region, in other words seam (D). The layer is in effect more fragile in this region. The die pressing of the welding region reduces its mechanical strength which becomes below that of the non-welded regions. Tearing strength can vary; it will however be adjusted to be advantageously situated between 700 and 1000 g/15 mm, which corresponds to the values for current peelable films.

A wide weld region or seam is advantageous, in order to facilitate re-closing of the packaging and to guarantee a sufficient re-adhesion force. Seam width will for example be from 4 to 12 mm, preferably between 5 and 8 mm.

Adhesive layer (3) ensures re-closing of the packaging once opened.

This layer is sandwiched between complexable layer (2) and the tearable welding layer (4). Adhesion of the adhesive layer onto these layers is preferably greater than the value corresponding to the tearing force to be applied to the welding seam while the packaging is being opened. Such adhesion will consequently preferably be greater than 1000 g/15 mm. To obtain this adhesion, the complexable and tearable welding layers comprise, for example, a metallocene PE or a bonding resin. Tearing will preferentially occur in the adhesive layer; rupture is cohesive. Thus, a portion of the pressure sensitive adhesive will be located on each face of the packaging. Re-closing force thus becomes a maximum as there is adhesion of the adhesive to itself. Additionally, if the tearable welding layer for example comprises metallocene PE or a binder, there will also be good adhesion of the adhesive on this layer, which facilitates packaging face repositioning.

The adhesive layer comprises a pressure-sensitive adhesive (or is self-adhesive). This can be a hot melt adhesive, notably based on an elastomer or other polymers which are not elastomeric, such as EVA. This adhesive may also not be of the hot melt type, but be diluted in a solvent medium or aqueous phase.

Very generally speaking, and without this being limiting, the hot melt adhesives comprise:

a) polymers such as EVA, PE, PP, EEA (ethylene ethyl acrylate) and the thermoplastic elastomers or rubbers ((block) styrene copolymers of the styrene-butadiene type, styrene-isoprene, styrene-ethylene/butadiene type, or butadiene-based polymers such as NBR or, yet again, ethylene-propylene copolymers such as EPR).
They make up from 5 to 50% of the formulation and their purpose is to provide: adherence (polarity), barrier properties, brilliance, mechanical strength, flexibility and viscosity control.

b) resins (tackifyers) which can be natural (colophane esters, terpene or terpene-phenolic esters), or oil-based, aliphatic or aromatic. They make up from 0 to 45% of the formulation. They increase the hot tack, adherence and control cohesion.

c) paraffins and waxes, which can make up some 20 to 80% of the formulation. They play a role in providing barrier, brilliance, rigidity, cost, drop point, and hot melt hardness properties.

d) plasticizers which can make up some 0 to 10% of the formulation. They increase cold tack and control hot melt flexibility and viscosity.

e) anti-oxidants which make up from 0.2 to 10% of the formulation. They stabilise the components when hot and when cold.

f) fillers which make up part of the formulation when particular properties are desired such as UV-resistance (oxidation resistance), flame proofing, anti-allergy properties, rheology, tearing in the thickness, etc.

Preferably a self-bonding hot melt adhesive is employed constituted by a mixture of elastomer and tackifying resin. The adhesive consists of a mixture of:

40 to 80% thermoplastic elastomer 20 to 60% tackifying resin

<30% of other constituents: plasticizing oil, anti-oxidation agents, additives etc.

One example of such a hot melt adhesive is M3062 from Ato Findley (melt index of 5.3 g/10 min, at 190° C. under 2.16 kg).

The adhesive will notably comprise, by way of additives, inorganic fillers of the talc or calcium carbonate type, or processing agents (fluorine-containing products), introduced in relatively large amounts (compared to the amounts normally employed). For example, in the case of inorganic fillers, content is for example between 3 and 15% by weight. For example, in the case of fluorine-containing products, content is for example between 0.2 and 3% by weight.

The additive is added in the majority of cases in the form of a master batch; in this case, the adhesive in general comprises from 5–25% by weight of a master batch containing a filler or processing agents.

By way of examples of additive-containing adhesive able to be used in the invention the following formulations can be mentioned:

a) 93% M 3062 and 7% of Schulman RTL 1098 master batch (composed of 70% talc flake and 30% PE resin).

B) 80% M 3062 and 20% of Schulman Polybatch AMF 702 master batch (composed of 2% Viton Free Flow 10 from Du Pont and 98% PE resin).

These additives are however not employed where the process is the "bubble collapsing" process.

It is also desirable that a multilayer film comprising a layer and an adhesive as above, may be transformed. One will consequently preferably choose adhesives of sufficiently high viscosity to avoid, or limit to the maximum extent, creep (which would otherwise lead to deformations such as variations in thickness, formation of "waves", etc) as well as flow of adhesive between the layers during thermoforming and its flowing onto the welding equipment.

High viscosity also reinforces the phenomenon of absence of deformation when a heated sealing jaw is applied to make the weld (with welding taking place at the lid side).

Binder layers can be present, between the adhesive and complexable layers and/or between the adhesive and tearable welding layers and/or between the adhesive layers and the support. If such layers of binder (L) are employed (the structure then becoming a five-layer structure such as PE/L/HotMelt/L/PE), the complexable layers and/or tearable welding layer (and/or support layer) can then have a simpler composition, without adding binder and/or metallocene PE (even in this case however, a welding layer supplemented by additives is preferred). The binder able to be employed in the pure state in the intermediate layers, or diluted in the complexable and/or tearable welding layers is a co-extrusion binder which can be notably chosen from the above polyolefins which are modified. As starting polyolefin, one will for example take PE, EVA copolymers with a high monomer content, etc. Modification is done by grafting or copolymerization. For example, the polyolefin can include maleic groups (for example, via maleic anhydride). It is possible to use as a binder pure metallocene PE.

The binder is preferably chosen so that the adhesion force is greater than the tearing force of the adhesive layer.

When binder layers are employed, the thickness of the structure (C) is then for example comprised between 40 and 200 $\mu$m, preferably 50 to 100 $\mu$m. The thickness of the binder layers is generally comprised between 2 and 10 $\mu$m, preferably between 3 and 5 $\mu$m.

Figure 3:
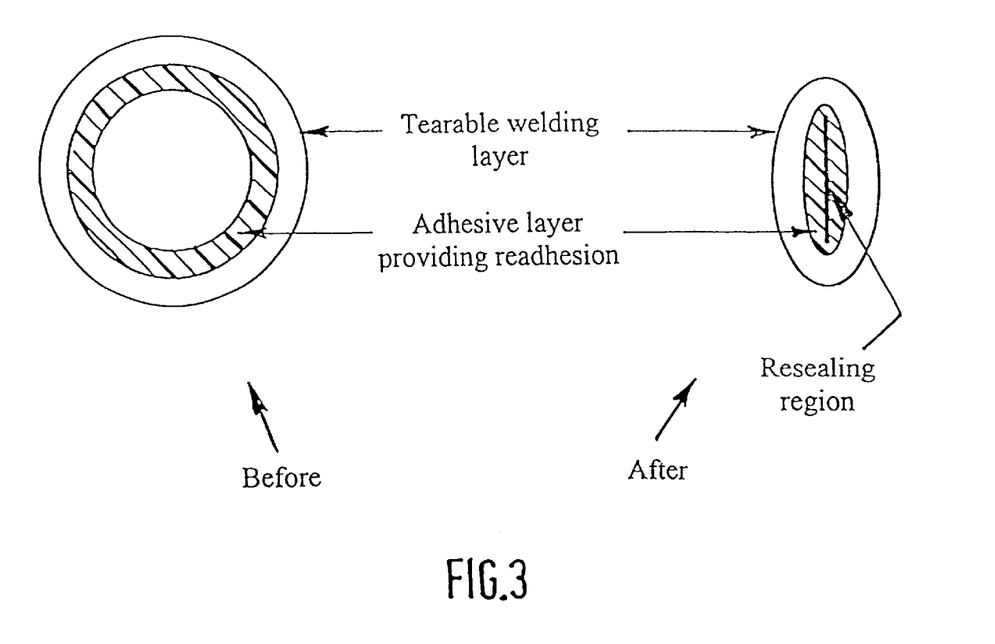
FIG. 3 shows the extrusion bubble in one embodiment, before and after collapsing.

Several processes can be used to prepare structure (C). These processes comprise cast extrusion (flat exclusion), blown film extrusion (blown bubble extrusion), etc. One valuable process is the blown film extrusion process in which, preferably, structure (C) is obtained by collapsing the co-extrusion "bubble". This embodiment is shown in FIG. 3. This embodiment produces a symmetrical structure, wherein the complexable layer (2) and tearable welding layer (4) have the same composition. If adhesive layer (3) comprises two sub-layers (3a) and (3b) respectively, then, in such embodiment, layer (3') would also comprise two corresponding sub-layers: (3a)' and (3b)'. In any event, there is now a region of weakness between the two layers where 3 abuts 3'; in effect, in the re-adhesion region, the adhesive resin adheres to itself whereas in the case of one layer, the latter has been obtained by melting, leading to the formation of a homogeneous mass which is stronger thanks to its elastomeric nature. Using collapsing of the bubble, the need to modify the composition of the pressure-sensitive adhesive to be absolutely sure of achieving ready tearing within the body of the adhesive layer becomes superfluous.

When extruding the tube, air is generally employed for blowing (expanding) the bubble and for cooling it. The air produces a slight surface oxidation of the (hot melt), adhesive layer prior to re-bonding. The force needed to achieve tearing in the adhesive layer is smaller in the region where the layers have been rebonded, due to the slight surface oxidation thereof, compared to that within the actual layers Such oxidation can further be favored by injecting an oxidizing agent at the bubble. Ozone taken from the Corona discharge treatment equipment can be employed as the oxidizing agent.

Collapsing of the bubble can for example take place at a temperature comprised between 40 and 60° C. and at a pressure from 4 to 6 bars, preferably around 5 bars, at haul-off roller level.

Another possibility is to vary operating conditions. In effect, the re-bonding strength of the layers is a function of the pressure exercised by the haul-off rollers and of film temperature. It is possible to adjust these parameters so that the strength of the new bond is lower than the forces of adhesion between the adhesive layer and the complexable/tearable welding layers. In this way, the adhesive layer will of necessity be present on both faces of the packaging (after opening).

This bubble collapsing technique can also be applied to structures comprising binder layers. The apparatus will be suitably adapted; layer composition will also be adapted as indicated above.

It should be noted that this structure obtained by bubble collapsing can apply to any type of packaging, whether according to the invention or according to the prior art. Thus, the structure can be employed as an integral part of a container or of the lid, or as a film able to be sealed to itself when making bags or pouches. Thus, this structure obtained by bubble collapsing can notably apply to the packaging that are the subject-matter of international application WO-A-97 19867 in the name of the applicant, as well as to the packagings disclosed in French Patent application 2,669, 607, U.S. Pat. No. 4,673,601 and European Patent application 0661154.

Thus, the invention will find application notably (but not limited to) in a closing structure provided with an opening comprising a sheet sealed along the edge of the opening, this sheet being constituted of at least three layers, viz a welding layer applied and welded along a seam against the edge of the opening, an outer layer forming a barrier, and an intermediate adhesive layer; welding of the welding layer seam on the edge of the opening will have a resistance to being torn-off greater than the adhesive force between the welding layer and the adhesive layer so that, at the first operation for opening up the opening, the welded seam will remain in place on the edge of the opening and will separate from the remainder of the welding layer and from the adhesive layer which is consequently exposed in one region and allowing, following fresh application against the seam, the container to be once again closed. In this case, the structure according to the invention provides the welding layer and the adhesive layer, the complexable layer becoming integral with the outer barrier-forming layer (which then comprises the complexable layer and a support layer).

The multilayer structure (C) obtained by collapsing the bubble according to the invention can also be applied to doypacks (bags or sachets which stand upright, for example washing powder refills) to facilitate their opening and ensure ready re-closing. This avoids having to add a zip® strip which is expensive and difficult to apply during manufacture (risk of leakage). This structure can also serve for closing pots and trays obtained by injection molding. The structure can also be employed as a sealing agent in structures intended for packaging on a horizontal machine of the FFH type (for example for long-conservation bread, cheese slices).

The structure (C) according to the invention, whether or not it is obtained by collapsing the bubble, can be applied to a support film. The support film provides the mechanical and gas-barrier properties, as well as a water vapor barrier and one against smells.

For the support film, one can employ polyolefins (cast PP, oriented PP, PE), polyamides (cast PA, copolyamide, mono- or bi-oriented PA), styrenic plastics (crystalline PS, impact PS, oriented PS), PVC, impregnated or non-impregnated papers, polyesters (cast PET, oriented PET, crystallizable PET, PET G), aluminum, impregnated films (impregnated with PVDC, PVA, and the like), vacuum packaging metallized films (aluminum-based, in alumina, $SiO_x$, and the like).

Structure (C) is preferably laid on the support. According to this embodiment, the structure (C) is first prepared, notably by co-extruding, then this structure is applied onto the support by various techniques. It is possible to lay on this structure (C) by lamination, extrusion-lamination, hot-calendering or extrusion-coating. Depending on the technique used, the complexable layer receives an optional binding layer.

In the first two techniques above, a bonding layer (7) is present between the structure of the invention and the support and provides adhesion.

In case of lamination, steucture (C) is prepared, notably by coextrusion, then laid on the support, notably under cold conditions (i.e. a temperature below the melt temperature of the various films). The binding layer can be an adhesive or glue, notably a polyurethane adhesive or glue, especially of the polyether or polyester type, in a solvent or not. A corona treatment of the complexable layer is preferred.

In case of extrusion-lamination, structure (C) is prepared, notably by coextrusion, then laid on the support, (notably under cold conditions), a binding layer being placed between the structure (C) and the support, preferably by extrusion. This bonding layer can be a coextrusion binder of the type disclosed above. This binder will have preferably a melt temperature below the one of the support layer. Extrusion-lamination is similar to lamination, except that a binder is used in lieu of a glue. A corona treatment of the complexable layer is possible but optional.

In case of hot-calendering, structure (C) is prepared, notably by coextrusion, then directly applied onto the support (1), through calenders, which heat the previously prepared films. The layers being hot, they will adhere to each other. In this case, although it is possible, it is not necessary to use a supplementary binding layer (7), the complexable layer (2) being sufficient to ensure binding. This complexable layer can be e.g. a high content EVA layer. A corona treatment of the complexable layer is not necessary, it is not even desirable.

In case of extrusion-coating, the structure (C) coextruded still hot (optionally with a supplementary binding layer) is applied, while still hot, directly onto the support (e.g. a PET film).

It is preferred that the assembly formed of all layers of the structure, the binding layer and the support are not coextruded together, in opposition to the prior art.

Once the structure (C) has been laid on the support, this assembly is preferably thermoformed.

The lid comprises the support film (6) of the type described above, and the welding layer (5) of the type also described above. The tearable welding layer (4) and welding layer (5) will have the same composition, or differing compositions (while still however being compatible). These layers (6) and (5) can be bonded together, if necessary, by means of a binder layer (8) This binder can be of the same type as that described above.

The layers can comprise sub-layers, if appropriate. Thus, the support layer can comprise two layers of PET, between which a layer of printing ink and a layer of binder are located. Similarly, the complexable layer can comprise e.g. a high content EVA layer and a PE layer (adhesive side); this supplemental layer may act as a reinforcing layer.

The following examples illustrate the invention without limiting it.

EXAMPLE 1

Ham slices packaged under gas

The ham slices are packaged in a packaging composed, in its lower portion, of a container comprising a rigid thermoformed film and, in its upper portion, of the lid or cover comprising a flexible printed closing film. The container, of a total thickness of around 400 $\mu$m, is composed of the structure (C) of 50 $\mu$m thickness, laminated, using a polyurethane adhesive with a solvent, of 3 $\mu$m thickness, onto a rigid PVC film of 350 $\mu$m thickness. Layer thickness of the layers of structure (C) is distributed as follows:

14 $\mu$m of a greater than 38 dyne surface tension Corona discharge treated complexable film;

26 $\mu$m of pressure-sensitive adhesive layer;

10 $\mu$m of tearable welding layer.

The complexable layer has the following composition:

metallocene PE resin (60%)

LDPE resin (35%)

Master batch additives: slip agent, anti-blocking agent and antioxidant (5%)

The adhesive layer has the following composition:

80% M3062, and

20% of Schulman Polybatch AMF 702 master batch (composed of 2% Viton Free Flow 10 from Du Pont and 98% PE resin).

The tearable welding layer has the following composition:

metallocene PE resin (65%)

MDPE resin (20%)

Master batch containing filler (10%)

Master batch containing additives: slip agent, anti oxidant and processing aid (5%)

Complexing is done on a solvent complexing apparatus, adhesive being deposited on the complexable face of the structure (C). Thermoforming of the film is done to a depth of 16 mm to allow the ham slices to be put into place. Thermoforming temperature is comprised between 100 and 130° C.

The lid or covering film is printed and has a total thickness of 96 $\mu$m. Its structure is composed of:

50 $\mu$m of PVDC impregnated bi-oriented PET;

2 $\mu$m of printing ink layer;

3 $\mu$m of polyurethane adhesive;

23 $\mu$m bi-oriented PET (for giving the film body);

3 $\mu$m polyurethane foam;

50 $\mu$m welding layer.

This welding layer has the following composition:

LDPE resin (49%)

Linear octene PE resin (48%)

Additives: slip agent, anti-blocking agent and anti-oxidant (3%)

The two 3 $\mu$m layers of polyurethane+solvent adhesive provide the bond between the layers and are applied using a complexing machine with solvent extraction.

Welding of the two films composing the packaging is done at a temperature of 150° C. under 6 bars pressure for 1.5 seconds, using sealing jaws having either a flat or curved surface.

The force needed to open the packaging is between 800 and 1000 g/15 mm while the force obtained after the first re-closing is between 500 and 800 g/15 mm (as a function of the pressure applied). Opening force remains greater than 400 g/15 mm after 10 opening and re-closing operations.

EXAMPLE 2

Dried fruit packaging

Dried fruit are packaged loose in a packaging composed, in its lower portion, of a container film comprising a rigid thermoformed film and, in its upper portion, a lid comprising a flexible printed closing film. The container, of a total thickness of around 510 µm, is composed of a structure (C) of 60 µm thickness, laminated, by means of a solvent-less polyurethane adhesive 1 µm thick, onto a rigid amorphous PET film 450 µm thick. Thickness distribution of the layers of structure (C), obtained by bubble collapsing, is as follows:

15 µm of more than 38 dyne Corona discharge treated complexable layer;
15 µm of a pressure-sensitive adhesive layer;
15 µm of a pressure-sensitive adhesive layer;
15 µm of tearable welding layer.

The structure is obtained by bubble collapsing, with an oxidizing medium.

Because of collapsing of the bubble, both the complexable and tearable welding layers have the same composition as follows:

metallocene PE resin (65%)
MDPE resin (20%)
Master batch containing filler (10%)
Master batch containing additives: slip agent, anti-oxidant and processing aid (5%)

Due to collapsing of the bubble, the adhesive layers have the same composition as follows:

M3062

Complexing is done on a complexing machine without solvent, the adhesive being deposited on the complexable face of structure (C). Heat shaping of the film is done to a depth of 25 mm to allow the dried fruit to be put into place. The thermoforming temperature is comprised between 100 and 130° C.

The lid or covering film is printed and has a total thickness of 99 µm. Its structure is as follows:

12 µm of bi-oriented PET;
2 µm of printing ink layer;
1 µm of solvent-free polyurethane adhesive;
23 µm of bi-oriented PET (for giving the film body);
1 µm of solvent-free polyurethane adhesive;
60 µm welding layer.

The composition of the welding layer is as follows:

LDPE resin (49%)
Linear octene PE resin (48%)
Additives: slip agent, anti-blocking agent and anti-oxidant (3%)

The two 1 µm layers of solvent-free polyurethane adhesive provide the bond between the layers and are deposited using a complexing machine without solvent.

Welding of the two films composing the packaging is done at a temperature of 155° C., under a pressure of 6 bars for 1.5 seconds, using sealing jaws which can be flat or curved.

The force needed to open the packaging is between 900 and 1,200 g/15 mm (as a function of the pressure exercised). The force required to open the packaging remains greater than 400 g/15 mm after 10 opening and re-closing operations.

What is claimed is:

1. A multilayer structure comprising:
   an extrudable central pressure-sensitive adhesive layer comprising two opposed outermost sides, wherein the central adhesive layer comprises two extrudable pressure-sensitive adhesive sub-layers,
   a first extrudable outer layer interposed on one outermost side of the central pressure-sensitive layer, and
   a second extrudable outer layer interposed on the opposite outermost side of the central pressure-sensitive layer,
   provided that at least one of the extrudable outer layers is able to function as a tearable welding layer,
   said structure being formed by collapsing a co-extrusion bubble.

2. The multilayer structure according to claim 1, wherein the co-extrusion bubble is collapsed in an oxidizing medium.

3. The multilayer structure according to claim 1, wherein the extrudable central pressure-sensitive adhesive layer comprises a thermoplastic elastomer-based hot melt adhesive.

4. The multilayer layer structure according to claim 1, wherein each extrudable outer layer comprises a polyolefin.

5. The multilayer structure according to claim 1, wherein the polyethylene is a metallocene polyethylene.

6. A multilayer structure comprising:
   an extrudable central pressure-sensitive adhesive layer comprising two opposed outermost sides, wherein the central pressure-sensitive adhesive layer is formed from two extrudable pressure-sensitive adhesive sub-layers, each of which comprises a thermoplastic elastomer-based hot melt adhesive,
   a first extrudable outer layer interposed on one outermost side of the central layer, wherein the first extrudable outer layer comprises a polyethylene, and
   a second extrudable outer layer interposed on the opposite outermost side of the central layer, wherein the second extrudable outer layer comprises a polyethylene,
   provided that at least one of the extrudable outer layers is able to function as a tearable welding layer,
   said structure being formed by collapsing a co-extrusion bubble.

7. The multilayer structure according to claim 6, wherein the co-extrusion bubble is collapsed in an oxidizing medium.

8. The multilayer structure according to claim 6, wherein the polyethylene is a metallocene polyethylene.

9. The multilayer structure according to claim 4, wherein the polyolefin is a polyethylene.

10. A multilayer package comprising:
    an extrudable central pressure-sensitive adhesive layer comprising two opposed outermost sides, wherein the central adhesive layer comprises two extrudable pressure-sensitive adhesive sub-layers,
    an extrudable inner layer interposed on one outermost side of the central pressure-sensitive layer, wherein the inner layer is able to function as a tearable welding layer,
    optionally, an extrudable complexable layer comprising an innermost side and an outermost side, wherein the innermost side of the optional complexable layer is interposed on the opposite outermost side of the central pressure-sensitive layer,
    optionally, an extrudable bonding layer comprising an innermost side and an outermost side, wherein the innermost side of the optional bonding layer is interposed on the outermost side of the optional complexable layer, and
    an extrudable outer support layer interposed on the outermost side of the optional bonding layer,
    wherein at least a portion of the package is formed by welding the inner layer to itself.

11. The multilayer package according to claim 10, wherein the extrudable complexable layer is present.

12. The multilayer package according to claim 10, wherein the extrudable bonding layer is present.

13. The multilayer package according to claim 11, wherein the extrudable bonding layer is present.

14. The multilayer package according to claim 11, wherein the extrudable complexable layer comprises a polyolefin.

15. The multilayer package according to claim 10, wherein each of the two extrudable pressure-sensitive adhesive sub-layers is present and comprises a thermoplastic elastomer-based hot melt adhesive, the extrudable inner layer comprises a polyethylene, the extrudable outer support layer comprises a polyethylene, and wherein the co-extrusion bubble is collapsed in an oxidizing medium.

16. The multilayer package according to claim 15, wherein the extrudable complexable layer is present.

17. The multilayer package according to claim 15, wherein the extrudable bonding layer is present.

18. The multilayer package according to claim 16, wherein the extrudable bonding layer is present.

19. The multilayer package according to claim 16, wherein the extrudable complexable layer comprises a polyolefin.

* * * * *